March 24, 1959 — M. GARBUNY ET AL — 2,879,424
IMAGE DETECTOR
Filed April 4, 1955
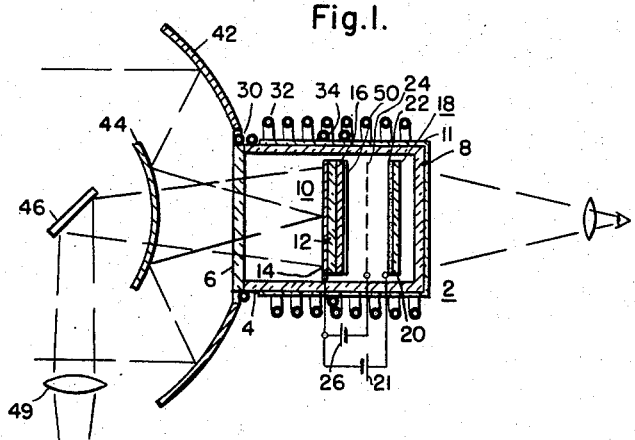
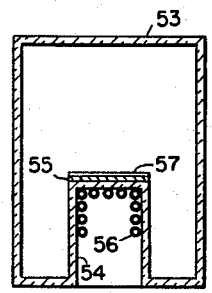
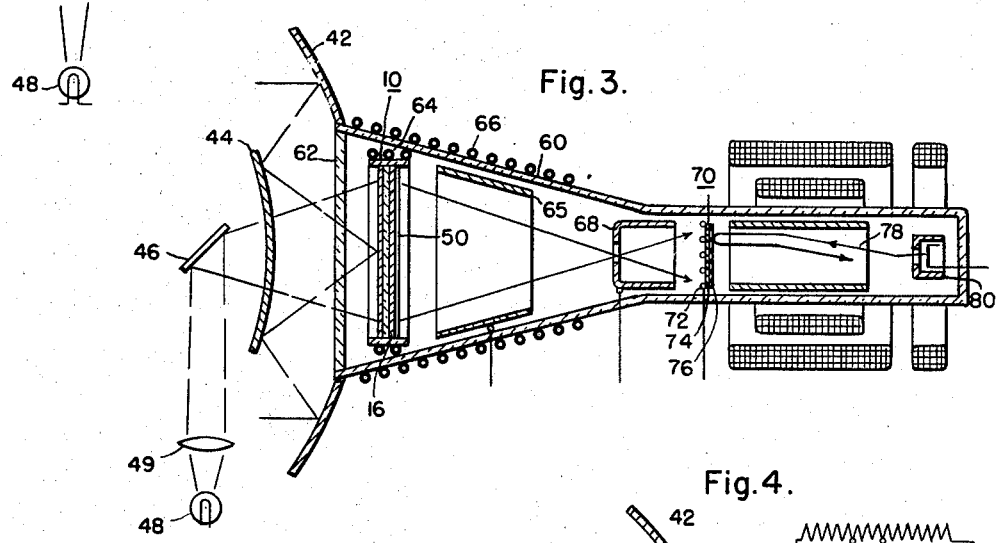
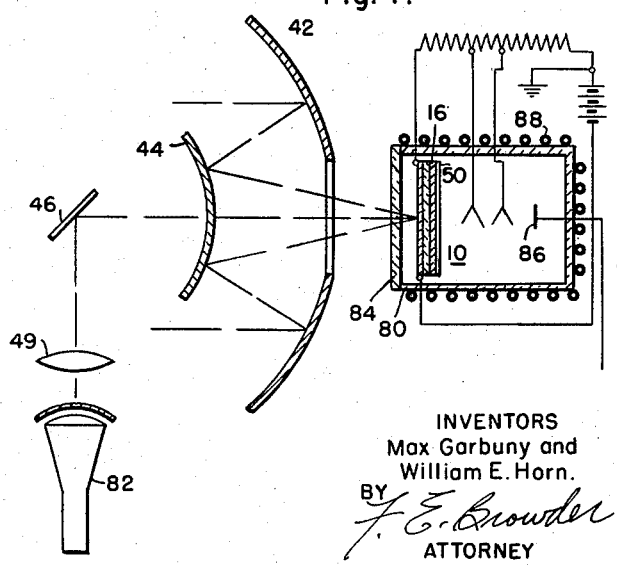
WITNESSES:
E. A. McCloskey
C. F. Renz
INVENTORS
Max Garbuny and
William E. Horn.
BY J. E. Browder
ATTORNEY

United States Patent Office 2,879,424
Patented Mar. 24, 1959

2,879,424
IMAGE DETECTOR

Max Garbuny, Pittsburgh, and William E. Horn, Monroeville, Pa., assignors to Westinghouse Electric Corporation, East Pittsburgh, Pa., a corporation of Pennsylvania Application April 4, 1955, Serial No. 499,187

7 Claims. (Cl. 313—100)

This invention relates to radiation detectors and more particularly to thermal image converters.

Thermal image converters detect and translate a thermal or heat image into a light image by virtue of differential radiation due to differences in temperature or emissivity of various objects within an observed scene.

It is an object of our invention to produce a highly sensitive thermal detector.

It is another object to provide a thermal image converter for visual observation of a scene by means of the infrared radiations emitted therefrom at low temperatures.

It is another object to provide a thermal image converter for direct viewing of the scene observed.

It is another object to provide a thermal image detector capable of incorporation into conventional type image pickup tubes to obtain enhanced or amplified images therefrom.

These and other objects are effected by our invention as will be apparent from the following description taken in accordance with the accompanying drawings, throughout which like reference characters indicate like parts, and in which:

Figure 1 is a schematic showing of a direct viewing thermal image converter in accordance with one embodiment of our invention;

Fig. 2 is a schematic showing of the basic thermal detector in accordance with our invention for purposes of illustration and explanation;

Fig. 3 is a schematic showing of a thermal image pickup tube built in accordance with our invention within an image vidicon tube type structure; and Fig. 4 is a schematic showing of a thermal image converter built in accordance with our invention within a photothermionic type tube structure.

Referring in detail to Fig. 1, there is provided a vacuum type envelope 2 having a cylindrical body portion 4 of a suitable material such as glass. The cylindrical body portion 4 is provided with closure members or end plates 6 and 8. The input window or end face 6 is transparent to infrared radiation of at least the range 8 to 12 microns in wavelength and visible radiations. A suitable material for the input face or window 6 is barium fluoride which is capable of transmitting wavelengths of the range between .2 and 12 microns. The output window or end face 8 is of a suitable material such as glass and is transparent to visible radiations. It may also be desirable to utilize a conductive exterior coating 11 covering substantially the entire body 4 and the output window 8. A suitable material for this application is stannic oxide, more commonly referred to by its trademark NESA. The NESA layer, which is transparent to visible light, provides a suitable transparent covering material for the output window 8.

Positioned within the envelope 2 is a photoelectric screen 10. The photoelectric screen or input screen 10 is comprised of a supporting layer 12 of a suitable material such as silicon monoxide. The supporting layer 12 is a thin freely supported film having a thickness of about 300 angstroms. The support layer or film 12 may be constructed by methods known in the art such as evaporation of the silicon monoxide on an organic film and later baking the organic film out. A mesh of fine threads of glass or other suitable material may also be utilized to enhance the strength of the input screen 10. In this structure, an organic film is deposited on one side of the mesh and the silicon monoxide evaporated onto the other side. Later the organic film is removed by baking in the presence of oxygen so that only the thin inorganic film is left adhering to the support web. An infrared absorbing layer 14 is deposited on the side of the support member 12 facing the input window 6. The infrared absorbing material may be of any suitable type such as gold black. The gold black layer is formed by evaporating gold in a vapor of nitrogen at about 1 mm. Hg. The effective thickness of the gold black layer 14 is of the order of 200 angstroms. A photoemissive layer 16 is evaporated on the opposite side of the support layer 12 with respect to the infrared absorbing layer 14. The photoemissive layer 16 is of a suitable material, such as cesium antimonide ($Cs_3Sb$) capable of emitting electrons upon light impingement. The photoemissive layer 16 is of the order of 300 angstroms in thickness. The total thickness of the photoelectric screen 10, that is the elements 12, 14 and 16, should be less than 1000 angstroms. It is important to limit the thickness of the photoelectric or input screen 10 in order to obtain a low thermal time constant in order to enhance recovery time. It has been found by limiting the thickness of the input screen to less than 1000 angstroms that a recovery time of the order of $1/30$ of a second or less is obtainable.

Instead of using gold black or other feathery structure 14, a space impedance matching layer in the form of a thin metal film such as nickel or aluminum may be used as infrared absorber. If such a film is evaporated on the screen with such a thickness that it represents a resistance of about 188 ohms laterally across a square, it will absorb about 50% of the incident infrared radiation (see e.g. M: Golay, The Review of Scientific Instruments, vol. 18, pp. 357–362, 1947). It is also possible to make the infrared absorbing layer simultaneously the support layer, thus eliminating one of the evaporation processes. It is also possible to employ in place of the above described input screen structure 10 a suitable isolated sheet of photoemissive material without the necessity of the support film in addition to the infrared absorbing layer. The main requirement of the input screen 10 is that it has low heat capacity, that it be photoelectrically responsive and that it be capable of absorbing thermal radiations. The photoemissive layer 16 may be of a compound made up of an element from column 1A of the periodic table, particularly those elements from lithium to cesium in combination with an element from column 5A at a ratio of 3 atoms of the element in column 1A to 1 atom of the element of column 5A. An element from column 1A from lithium to cesium may also be combined with an element from column 6A of the periodic table at a ratio of 2 atoms of the element in column 1A to 1 atom of the element from column 6A.

While these compounds are known to have high photoelectric yields, it is also possible to use a metal membrane simultaneously as self-support and photoelectric layer. Furthermore, if such a layer is of such thickness as to present a space impedance match, it will also assume the role of infrared absorber without the need of an additional layer for this purpose.

An output or image screen 18 is positioned between the output window 8 and the photoelectric or input screen 10 for converting an electron image into a light image. The electron stream or image from the input screen 10 may be also amplified by various means known in the art, some of which will be described later. The output screen 18 is comprised of a transparent supporting member 20 such as glass with a transparent conductive coating such as NESA thereon. A phosphor layer 22 of a suitable material such as zinc sulphide activated by silver, is provided for producing substantially white light upon electron bombardment. The phosphor layer 22 is deposited on the surface of the support member 20 facing the input screen 10.

A suitable voltage represented by the battery 21 is applied between the input screen 10 and the output screen 18 to accelerate the electrons from the input screen 10 to the output screen 18. In certain applications, it is also desirable to provide a grid 24 of a fine mesh conductive material adjacent to the photoemissive surface 16 to retard slower electrons and pass only the fast electrons. A suitable potential represented by the battery 26 is provided between the input screen 10 and the grid 24 for this biasing or control action.

A vapor is also introduced into the envelope 2 prior to sealing and in the case of a photoemissive layer 16 of cesium antimonide a suitable vapor material would be cesium. It is desirable that the vapor utilized within the envelope 2 be of a similar material as the element taken from column 1A of the periodic table utilized in the photoemissive layer 16 so as to insure against instability of the photoemission properties of the layer 16. In one specific example the cesium vapor was introduced to a pressure of about $10^{-5}$ millimeters of mercury with the envelope 2 and input screen 10 operated at substantially room temperature (300° Kelvin). When the cesium vapor is introduced into the envelope 2 the vapor will immediately seek equilibrium conditions with the walls and the electrodes within the envelope. The amount of the vapor condensing on the electrodes and the walls of the envelope is dependent and controlled by the pressure within the envelope, and the temperature and energy of adhesion of the surfaces therein. A portion of the vapor will condense on the surface of the photoemissive layer 16 to a predetermined thickness and will hereafter be referred to as control layer 50.

Positioned on the exterior portion of the envelope 2 are means for preferentially heating or cooling the cylindrical wall 4, the input and output windows 6 and 8 and selected electrodes within the envelope. A coil 30 is provided around the wall 4 of the envelope 2 near the input window 6 to provide lateral temperature control of the input window 6. A coil 32 is also provided around substantially the entire length of the wall 4 to control the temperature of the wall 4 and the output window 8 in conjunction with conductive coating 11. A coil 34 is also provided for controlling the temperature of the input screen 10. It may also be desirable in some applications to control the temperature of the output window 8 separately from the wall 4 or control other structures with the envelope 2.

Means are also provided exterior of the envelope 2 and near the input window 6 of the envelope for focusing thermal images onto the input screen 10. This means may comprise any of several suitable types of focusing apparatus. One system as shown herein includes a Cassegranian telescope collecting mirror 42 and a semi-transparent mirror 44. The semi-transparent mirror 44 is located with respect to the collecting mirror 42 so as to reflect the infrared radiations from the collecting mirror 42 onto the input screen 10.

On the opposite side of the semi-transparent mirror 44 with respect to the envelope 2 is provided directing mirror 46. A light source 48 in cooperation with a focusing means 49 illuminates the directing mirror 46. The light focused by means of the lens 49 onto the mirror 46 is reflected and directed through the semi-transparent mirror 44 to illuminate the entire area of the input screen 10 with uniform light intensity. The wavelength of the light source 48 may be adjusted to the most suitable range by filters or other means such as mirrors 44 and 46 which may reflect selective wavelengths for the photoemissive material utilized in the layer 16.

The operation of the apparatus shown in Fig. 1 is substantially as follows: The light from the source 48 illuminates the input screen 10 and the temperature of the input screen is adjusted by means of the coil 32 so that there is substantially no electron flow, or an electron flow of predetermined magnitude, from the input screen 10 to the output screen 18. The temperature of the input screen 10 controls the thickness of the control layer 50 in a manner to be described later. An image of the infrared radiation from an observed scene is then focused onto the input screen 10 by means of the Cassegranian telescope reflector 42 and the mirror 44. The infrared image impinging on the input screen 10 is substantially absorbed by the infrared absorbing layer 14 thereby forming a temperature pattern corresponding to the infrared or thermal image of the observed scene. The temperature pattern or image on the absorbing layer 14 is substantially simultaneously impressed on the photoemissive layer 16 and the control layer 50.

In order to fully explain and illustrate the invention, it is believed necessary to refer to the simplified thermal image detector shown in Fig. 2. It is known in the art of photoemission that layers of a thickness from a fraction of an atom to multiples thereof on top of a photoemissive surface may greatly enhance or in other cases greatly decrease the yield per quantum of light. It should be pointed out here that a monatomic layer of cesium corresponds to the order of $4 \times 10^{18}$ atoms per square meter of surface. Therefore, the expression "thickness of less than a monatomic layer" indicates that the density of the atoms on the surface is less than $4 \times 10^{18}$. The underlying cause of the enhancement of photoemission in response to certain wavelengths of light by a layer of material is a reduction in the work function. It is also known that an increase in work function of the photoemissive surface will decrease the electron yield per quantum of light. Another effective process for decreasing the electron yield per quantum of light lies in the absorption of photoelectrons in the layer.

Both the absorption effect and the work function effect depend greatly on the thickness of the layer. The thickness of such layers may under certain conditions be sensitive and reversible functions of the temperature of the photoemissive surface. One such effect is simply the condensation of a vapor to the liquid or solid phase on a cool surface and the evaporation therefrom as the temperature is raised. The temperature of the surfaces will vary the equilibrium vapor pressure within the enclosure.

Referring in detail to Fig. 2, there is shown a cylindrical enclosure or envelope 53 having a re-entrant portion 54 with a photoemissive surface 55 deposited on the interior surface of a portion of the re-entrant portion 54. A heating and cooling means represented by a coil 56 is provided for heating or cooling the photoemissive surface 55. A vapor is introduced into the interior of the enclosure 53. If it is assumed that the photoemissive surface 55 and the remaining surface of the enclosure 53 are of the same temperature, a portion of the vapor will condense on the surfaces and seek equilibrium pressure corresponding to the temperature. A condensation layer will be formed on the photoemissive surface 55 represented by the layer 57. The thickness of the layer 57 is a sensitive and reversible function of the temperature of the photoemissive surface 55. More particularly, if binding or adhesion energies between the vapor atoms and the surfaces of 53 and 55 can be ignored, and if the temperature of 55 is lower than that of 53, some of the vapor will condense on 55, forming film 57, such that the vapor pressure corresponds to the temperature of 55. When the temperature of 55 is slightly increased or decreased, some of the condensed atoms of layer 57 will enter the vapor phase or return from it, respectively, decreasing or increasing the thickness of layer 57, respectively. Similarly, if an element of the layer 55 is raised in temperature over that of the rest of layer 55, the thickness of the corresponding element of the control layer 57 will commence to decrease, and this process will continue until either the element temperature has come to equilibrium by virtue of the evaporation heat loss or until the control layer 57 thickness has become zero. The inverted process occurs when the element temperature is lowered, that is, the element layer thickness will commence to increase, and this process will continue until either the element temperature has come to equilibrium with the rest of 55 or until all of the condensate is concentrated on the element.

These simple phenomena are considerably modified when adhesive energies are taken into account which usually exist between atoms of the vapor phase and any of the surfaces with which the vapor comes in contact. The forces at play in ths phenomenon are difficult and not always readily understood. It should be noted, however, that the binding energy for an atom coming from the vapor phase is a function of the number of like atoms already on the surface. The temperature of the photoemissive surface 55 enters into this process in a compensating way, that is, tending to shake loose the adhering particles within the layer 57. It is found that the probability of adhesion of an atom from the vapor to the surface is a function of the ratio $W(\delta)/kT$, where $W(\delta)$ is the energy of adhesion which depends on layer thickness $\delta$, $T$ the absolute temperature at that point and $k$ the Boltzmann factor. The energy $W(\delta)$ of adhesion will generally decrease as the thickness $\delta$ of the already present vapor atoms increases.

Again referring in detail to Fig. 2, and assuming that both temperature and energy of adhesion of the photoemissive surface 55 and the envelope 53 are the same, the vapor will condense on both the photoemissive surface 55 and the envelope 53 to the same thickness to reach equilibrium pressure.

In general, the vapor pressure will be lower than that corresponding to the temperature due to the existence of binding forces. The case, however, which is of particular interest for purposes of this invention is that in which the temperature and binding energies of envelope 53 and photoemissive surface 55 are different. If it is assumed that the temperature of the photoemissive surface 55 is higher than the temperature of the envelope 53, and that the energy of adhesion of the photoemissive surface 55 is larger than the energy of adhesion of the surface of the envelope 53, then equilibrium of the layer thicknesses on the tube 53 and the photoemissive surface 55 results when the number of atoms leaving the walls of the tube 53 due to the temperature and energy of adhesion is just equal to those leaving due to the temperature and energy of adhesion of the photoemissive surface 55. It is seen that temperature and adhesion energy balance each other on each of the surfaces 53 and 55 such that equilibrium thicknesses of the adhering vapor atoms result on each. Examples have been found by us for cesium vapor between glass and cesium antimony at different temperatures. Examples in which there exists an exchange of alkali vapor on metal with glass walls are also known in the art. In these cases an enhancement of photoemission may result with small added amounts of alkali metals such as described in Zworykin and Ramberg, "Photoelectricity," John Wiley & Sons, 1949, pp. 37–40.

It should be pointed out that the relationship of the surfaces with respect to the magnitude of their temperatures and adhesion energies may well be inverted. If the temperature of the photoemissive surface 55, and the energy of adhesion on it, is lower than the corresponding values on envelope 53, there will again result an equilibrium of layer thicknesses on the two surfaces. A less desirable condition would exist, if the temperature of the photoemissive surface 55 would be lower, and the adhesion energies for all possible control thickness values are higher than the corresponding values on envelope 53. For in this case, the thickness of the layer on envelope 53 would tend to be zero and all condensate would form on photoemissive layer 55. Once a given amount of vapor material has been admitted, there would then be little control of the layer thickness and hence of the operational point of the photocurrent. Furthermore, all exchange of vapor atoms is now limited to the surface 55 and the vapor stage. The number of atoms contained in even a monatomic layer is under average conditions large in comparison to that contained in the volume of the vessel. Hence, another disadvantage resides in the reduced sensitivity with which layer thickness 57 responds to small changes of temperature.

Referring again to Fig. 1, the heat pattern absorbed by the film 14 will be impressed on the control layer 50 through the support film 12 and the photoemissive layer 16 such that momentarily a temperature distribution or pattern results. On picture elements then with higher temperatures, some adherent atoms will leave but in general the process will be self-limiting since due to the atoms leaving, the energy of adhesion on the picture element will increase to a new value with the new equilibrium value of thickness. In turn, the colder picture elements will accept atoms from the walls of the envelope 2 through the vapor. The increasing thickness of the control layer 50 in turn results in decreasing the energy of adhesion to arrive at a new value with a new equilibrium value of thickness as an effect of the lower temperature. Thus the thickness of layer 50 adjusts itself to element temperature reversibly. An important consideration is that of the time constants with which these equilibrium conditions occur. The leaving, or evaporation, time for atoms due to heating depends only on the ratio of incident energy to the energy of adhesion, if the thermal time constant of the input screen is ignored. The time for the return, or condensing time, of the atoms, however, depends on the number of atoms that arrive and stick on the photoemissive surface. Assuming a vapor pressure of $10^{-5}$ millimeters mercury, and $3 \times 10^{11}$ vapor atoms per cubic centimeter, and a thermal velocity of $10^4$ centimeters per second, and a probability of sticking of .5, then approximately $4 \times 10^{14}$ atoms arrive per square centimeter per second which is of the order of magnitude necessary to establish a monatomic layer every second. These figures indicate that it is necessary that precautions be taken that the cooling or recovery time is not excessive. It is found that operations at higher vapor pressures or with variations of only fractions of a monatomic layer on the photoemissive surface are necessary.

It is thus seen that the control layer 50 responds to the heat pattern impressed thereon and a thickness variation is obtained corresponding to the heat pattern. This thickness variation of the control layer 50 is thus utilized to modulate the electron stream generated by the photoemissive layer 16 in accordance with the thermal image projected onto the input screen 10. The photoelectron image emitted by the photoemissive layer 16 will very sensitively represent the thermal image either in numbers or in velocity or both. The retarding grid provides a means of utilizing the velocity principle. The end result in either case is that the photoelectrons are accelerated to the output screen 18 and impinge on the phosphor layer 22 so as to convert the electron image into a light image corresponding to the original thermal image projected onto the input screen 10. An electrostatic or electromagnetic field may be used to focus the electrons onto the output screen 18. It has been found that a variation of photocurrent is obtainable with such a system using cesium vapor and cesium antimonide photoemissive layer in ratios of 300 to 1.

Referring in detail to Fig. 3, an amplification is provided in which the electrons impinge not directly on a phosphor but an electron bombardment type vidicon. The two structures are combined in one enclosure or envelope 60, which may be of any suitable material such as glass. The photoelectric structure 10 is positioned at one end of the envelope 60. The envelope 60 is provided with a face plate 62 at the end of the envelope 60 near the photoelectric or input screen 10 of similar material described with respect to the input window 6 in Fig. 1. A similar infrared focusing means and a light source means is provided for projecting illumination onto the input screen 10 and focusing the infrared image on the input screen 10 as described with reference to Fig. 1. Heating means are provided around the input screen 10 represented by the coil 64 for varying the temperature of the input screen 10 as desired. Also, coils 66 are provided on the exterior portion of the envelope to provide heating to the walls of the envelope 60 in a similar manner as described with reference to Fig. 1. A vapor is introduced into the envelope 60 and is of similar material properties as that described with reference to Fig. 1.

When an infrared image is projected onto the input screen 10, the photoemissive layer 16 on the input screen 10 generates at the surface thereof an electron image which is a replica of the thermal image projected onto the input screen in a manner previously described with respect to Fig. 1. An electron lens system symbolized by the electrodes 65 and 68 is provided with suitable leads for focusing a contracted replica of this electron image onto a target 70 which is shown schematically in section. The target 70 comprises a mesh support structure 72 which has a large ratio of open space to solid area. The mesh 72 supports a layer of aluminum 74 that is substantially transparent to the electrons focused on it by the electron lens system. The other face of the aluminum layer 74 is coated with a thin layer 76 of an insulating dielectric such as arsenic trisulphide or amorphous selenium which is briefly rendered substantially conductive along the path of electrons which have penetrated the aluminum layer 74. The face of the target 70 is scanned by an electron beam 78 directed from a suitable cathode ray gun 80 positioned within the envelope 60. The output signal from the tube is derived from the target 70. A more detailed description of the lens system, target and electron gun with scanning system is described in copending application Serial No. 416,875, now abandoned, filed March 17, 1954 by Robert J. Schneeberger and assigned to the same assignee.

The operation of the above arrangement is as follows: The thermal image is focused onto the input screen 10 in a manner previously described and impresses a thermal pattern on the input screen 10 corresponding to the thermal image. The thermal image impressed on the input screen 10 causes the thickness of the control layer 50 to vary in accordance with the heat pattern impressed thereon. This thickness pattern set up on the input screen 10 controls the electron emission from the photoemissive layer 16 so that an electron image is generated representative of the thermal image impressed on the input screen 10. The electron image is accelerated through the electron lens to the target 70 and penetrates the thin aluminum layer 74 to produce in the insulating layer 76 a conductivity image duplicating the space distribution of the electron bombarding image. When the electron beam 78 scans the face of the resistance layer 76, it brings the entire outer surface of the target 70 to the same potential as the cathode of the electron gun 80. As a result of this recharging action by the electron gun 80, a current flows through an output circuit (not shown) connected to the target 70 representative of the image scanned by the electron beam 78. The signals derived from the output circuit may be then utilized to modulate a television transmitter or connected directly to a television display device. In this manner, the thermal image may be brightened, enlarged and varied by standard television techniques.

Referring in detail to Fig. 4, there is shown another embodiment of our invention incorporated into a photothermionic image in another tube. The electrons from the input screen 10 are collected on a collector rather than impinging on a phosphor. The two structures are combined within one envelope 80. The infrared image is projected onto the input screen 10 as described with reference to Fig. 1 and a flying spot scanner light source 82 is utilized in place of the large area illuminating source in Fig. 1 so that a light scanning raster is projected through an input window 84 of similar material as the input window described in Fig. 1 onto the input screen 10 to scan a raster in a suitable manner. The envelope 80 in which the input screen 10 is contained contains a vapor in equilibrium as previously described with reference to Fig. 1. A collecting member 86 is positioned at the opposite end of the envelope 80 with respect to the input screen 10 and is connected by suitable leads to an output circuit (not shown) exterior to the envelope 80 for deriving a signal therefrom. An electron multiplier (not shown) may be positioned between the input screen 10 and the collector 86. A heating and cooling coil 88 is positioned around the exterior of the envelope 80 for preferential temperature control in a manner described with reference to Fig. 1. A more detailed description of the device employed is given in U.S. patent application Serial No. 304,502, filed August 15, 1952 by Max Garbuny and John S. Talbot, and assigned to the same assignee.

The operation of the apparatus shown in Fig. 4 is substantially as follows: The thermal image is focused onto the input screen by the Cassegranian telescope system as previously described with reference to Fig. 1. The infrared image impinging on the input screen 10 impresses a heat pattern on the input screen 10 corresponding to the thermal image focused thereon. The input screen 10 in response to the thermal pattern impressed thereon functions in a manner previously described, in that the thickness of the control layer 50 on the photoemissive layer 16 varies in a manner corresponding to the thermal image impressed thereon. The scanning light beam from the flying spot scanner 82 impinges on the photoemissive layer 16 causing electrons to be emitted with a density that is a function of the thickness of the control layer 50. The electrons emitted by the input screen 10 are collected by the collector electrode 86 and a current pulse is produced in the output circuit which may be utilized to modulate a transmitter or impressed by direct connections on the control grid of a conventional kinescope.

The embodiment shown in Fig. 4 has the advantage that no requirements are made on the perfection of electron optics. Hence, essentially high vapor pressures, such as $10^{-3}$ millimeters of mercury, and higher, can be applied with the ensuing speed of the film deposition time in cooling. This device allows the utilization of all the advantages of the photothermionic image tube as described in the latter patent application with the provision of heating means for the entire tube and means to allow a temperature difference between the photoemissive surface and the other surfaces as previously described and explained in the present application.

A preferred operating condition consists in heating envelope 80 and window 84 above the average temperature of the scene viewed by the apparatus. In this case, input screen 10 which is in radiation equilibrium with the viewed scene and the tube elements, will assume the lowest temperature of all elements contained in envelope 80. This fact, by itself, will favor condensation of the vapor on input screen 10. However, this condition may be compensated for by the fact that there are surfaces of glass, metal or other materials, such as carbon black, added for this particular storage purpose. These storage surfaces may absorb the vapor more eagerly under equal temperature conditions than the surfaces exposed on input screen 10 and layer equilibria will result. This has been demonstrated by using cesium as excess vapor and cesium antimony as photolayer. When a temperature pattern is impressed on input screen 10, the equilibrium is momentarily disturbed, cesium leaves from, or condenses on, the various elements according to the heat pattern, establishing a new equilibrium. The photocurrent in response to the scanning light registers very sensitively the thickness variations encountered, as previously described.

While we have shown our invention in several forms, it will be obvious to those skilled in the art that it is not so limited, but is susceptible of various other changes and modifications without departing from the spirit and scope thereof.

We claim as our invention:

1. A thermal image device comprising an envelope, a gaseous material in equilibrium within said envelope, an input screen within said envelope for receiving an image, said input screen comprised of at least an electron emissive layer for generating an electron stream and means for establishing an equilibrium pattern on said electron emissive layer responsive to said image.

2. A thermal image device comprising an envelope, a gaseous material in condensation equilibrium within said envelope, an input screen within said envelope for receiving an image, said input screen comprised of at least a photoemissive layer for generating an electron stream and means for establishing an equilibrium pattern on said photoemissive layer in accordance with said image.

3. A thermal image device comprising an envelope, a gaseous filling material within said envelope, an input screen for receiving a thermal image, said input screen comprised of at least a photoemissive layer for generating an electron stream and a control layer of said filling material condensed on said photoemissive layer and in equilibrium within said envelope.

4. A thermal image device comprising an envelope, a gaseous filling material within said envelope, an input screen for receiving a thermal image, said input screen comprised of at least a photoemissive layer for generating an electron stream and a control layer of said filling material condensed on said photoemissive layer and in equilibrium within said envelope, the thickness of said control layer varying in accordance with the temperature pattern of said thermal image.

5. A thermal image device comprising an envelope, a gaseous material within said envelope, an input screen within said envelope for receiving a thermal image, said input screen comprising an electron image layer for generating an electron stream, and means for absorbing said thermal image, means for maintaining the temperature of said envelope at a predetermined value, means for maintaining the temperature of said photoemissive layer at a different temperature, a control layer of said filling material condensed on said photoemissive layer and in equilibrium within said envelope, the thickness of said control layer varying in accordance with the temperature pattern of said thermal image for controlling the photoemission from said photoemissive layer and a light producing element for reproducing the electron image generated by said photoemissive layer.

6. A thermal image device comprising an envelope, a gaseous material in equilibrium with said envelope, an input screen within said envelope for receiving a thermal image, said input screen comprised of at least a photoemissive layer for generating an electron stream, a control layer of said filling material condensed on said photoemissive layer and in equilibrium, a reservoir surface within said envelope on which said filling material is condensed, means for separately controlling the temperature of said photoemissive layer and said reservoir surface, and said control layer varying in thickness in response to the temperature pattern of said thermal image for controlling the electron emission from said photoemissive layer.

7. A thermal image device comprising an envelope, a gaseous material in equilibrium within said envelope, an input screen within said envelope for receiving an image, said input screen comprised of at least a photoemissive layer for generating an electron image, means for establishing an equilibrium pattern on said photoemissive layer in accordance with said image, an electron collector electrode near said input screen for collection of electrons emitted therefrom and light scanning means for scanning a raster on said photoemissive layer.

No references cited.